United States Patent
Schmidt

(10) Patent No.: US 6,618,481 B1
(45) Date of Patent: Sep. 9, 2003

(54) METHOD FOR IMPROVING ACOUSTIC SIDETONE SUPPRESSION IN HANDS-FREE TELEPHONES

(75) Inventor: Gerhard Schmidt, Dreieich (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/637,588

(22) Filed: Aug. 14, 2000

Related U.S. Application Data

(63) Continuation of application No. PCT/DE99/00094, filed on Jan. 18, 1999.

(30) Foreign Application Priority Data

Feb. 13, 1998 (DE) .......................................... 198 05 942

(51) Int. Cl.$^7$ .............................................. H04M 9/08
(52) U.S. Cl. ........................... 379/406.14; 379/406.08; 379/388.07; 455/570
(58) Field of Search ...................... 379/406.14, 406.08, 379/388.04; 455/570

(56) References Cited

U.S. PATENT DOCUMENTS

| | | | | | |
|---|---|---|---|---|---|
| 4,956,838 A | * | 9/1990 | Gilloire et al. | ........ | 379/406.08 |
| 6,035,034 A | * | 3/2000 | Trump | ................... | 379/406.06 |

FOREIGN PATENT DOCUMENTS

| | | |
|---|---|---|
| DE | 37 28 109 C1 | 3/1989 |
| DE | 42 27 327 A1 | 2/1994 |
| EP | 0 739 102 A2 | 10/1996 |
| EP | 0 758 830 A2 | 2/1997 |
| EP | 0 769 867 A2 | 4/1997 |

OTHER PUBLICATIONS

W. Armbrüster: "Wideband Acoustic Echo Canceller With Two Filter Structure", *Signal Processing VI, Theories and Applications*, vol. 3, Elsevier, Amsterdam, *1992*, pp. 1612–1614.

Peter Heitkämper: "Ein Korrelationsmaβ zur Feststellung von Sprecheraktivitäten" [a correllation measure for determining voice activities], *8th Aachener Kolloquium Signaltheorie, University of Aachen, No. 3, 1997*, pp. 97–100.

S. Douglas Peters et al.: "A Self–Tuning NLMS Adaptive Filter Using Parallel Adaptation", *IEEE Transactions on Circuits and Systems—II: Analog and Digital Signal processing, vol. 44, No. 1, Jan. 1997*, pp. 11–21.

Mark Knox et al.: "A Highly Integrated H.320 Audio Sub_System Using The Motorola DSP5600x Digital Processor", pp. 312–320.

NEC advertising brochure: "RefleXion ™ Acoustic Echo Canceller on the μPD7701x Family".

* cited by examiner

*Primary Examiner*—Forester W. Isen
*Assistant Examiner*—Daniel Swerdlow
(74) *Attorney, Agent, or Firm*—Laurence A. Greenberg; Werner H. Stemer; Gregory L. Mayback

(57) ABSTRACT

A method for improving acoustic sidetone suppression in hands-free telephones, in particular for use in motor vehicles, is described. The telephone has a level discriminator and a plurality of adaptive echo compensation filters each processing a subband. In at least one subband, a further adaptive filter (a shadow filter) of a lower order is connected in parallel with the adaptive echo compensation filter. Spatial changes are detected with the aid of a combined evaluation of a correlation analysis and a residual error comparison of the two competing, adaptive filters.

10 Claims, 6 Drawing Sheets

METHOD FOR IMPROVING ACOUSTIC SIDETONE SUPPRESSION IN HANDS-FREE TELEPHONES

CROSS-REFERENCE TO RELATED APPLICATION

This is a continuation of copending International Application PCT/DE99/00094, filed Jan. 18, 1999, which designated the United States.

BACKGROUND OF THE INVENTION

Field of the Invention

The present invention relates to a method for improving the acoustic sidetone suppression in hands-free telephones, having a level discriminator and a plurality of adaptive echo compensation filters of which each processes a subband.

In the case of a hands-free telephone it is mandatory to suppress the signals of the remote subscriber which are emitted by the loudspeaker and therefore received again by the microphone, since otherwise unpleasant echoes disturb the connection. Until now, it has been customary for the purpose of suppressing these echoes, that is to say for the purpose of acoustic sidetone suppression, to provide a level discriminator which strongly damps the transmitting or receiving path as a function of the call situation. However, this renders duplex (full duplex mode) virtually impossible.

It has already been attempted using the prior art to date to make an adequate sidetone suppression available despite acceptable duplex mode properties. For this purpose, a frequency-selective, controllable echo suppression is provided in addition to the level discriminator. Such methods are described, for example, in the NEC advertizing brochure "REFLEXION Acoustic Echo Canceller on the µPD7701x Family", 1996, or in a description of the Motorola DSP5600x digital processor by M. Knox, P. Abbott, C. Cox, titled "A Highly Integrated H.320 Audiosubsystem Using The Motorola DSP5600x Digital Processor".

In the article titled "Wideband Acoustic Echo Canceller With Two Filter Structure" by W. Armbruister in Signal Processing Theories and Applications, Brussels, volume 3, No. CONF. 6, Aug. 24, 1992, pages 1611–1614, there is a description of a device for echo compensation in the case of video conferences which operates with an adaptive and a non-adaptive filter for linear compensation.

Published, European Patent Application EP 0 739 102 A2 describes a method for echo compensation in the case of which the received signal is split into a multiplicity of subbands for which the echo signal is estimated in each case.

Such echo suppression methods function satisfactorily in normal rooms. In the case of the use of hands-free telephones in motor vehicles, the detection of duplex—independently of the interior acoustics—becomes conspicuously more difficult than in office rooms. In particular, it is exceptionally difficult in motor vehicles to distinguish abrupt changes in the interior acoustics, for example, owing to movements of the vehicle occupants, from the duplex.

SUMMARY OF THE INVENTION

It is accordingly an object of the invention to provide a method for improving acoustic sidetone suppression in hands-free telephones that overcomes the disadvantages of the prior art methods of this general type, in which it is possible even in motor vehicles to detect a clear distinction between duplex and abrupt changes in the interior acoustics, and to take account of the distinction when controlling the hands-free telephone.

With the foregoing and other objects in view there is provided, in accordance with the invention, a method for improving acoustic sidetone suppression, which includes providing a hands-free telephone having a level discriminator and a plurality of adaptive echo compensation filters each processing a subband. A further adaptive filter of a different order is connected in parallel with an adaptive echo compensation filter of the adaptive echo compensation filters in at least one half band. Spatial changes are then detected using a correlation analysis and a power evaluation of an output of the further adaptive filter.

According to the invention, the further adaptive filter (shadow filter) of a lower order is connected in parallel with the adaptive echo compensation filter in at least one subband. Spatial changes can then be detected by the combination of a power evaluation of the two residual echo powers and a correlation analysis of the estimated and the measured microphone signals.

Use can preferably be made in this case of a plurality of different sampling rates. The computational outlay can be reduced thereby.

It is also preferred for the further adaptive filter to be of a substantially lower order.

The echo compensation is preferably implemented by a filter bank in frequency subbands.

Both power evaluations of the competing adaptive filters, and correlation-based analyses are preferably used for controlling the adaptation or step size.

It is likewise preferred for power transmission factors to be estimated in subbands in order to determine the step size.

It is likewise preferred for the echo compensation filters, to supply estimated values for the return loss introduced by them, since these estimated values can preferably be used for controlling the attenuation of the level discriminator. Consequently, the attenuation to be introduced by the level discriminator can be further reduced, and thus the call quality can be further improved in the case of duplex.

It is additionally preferred to detect the simultaneous activity of both call participants (duplex). It is then possible, for example, to reduce the overall attenuation of the level discriminator in the duplex case, in order further to improve the full duplex mode of the hands-free telephone.

Other features which are considered as characteristic for the invention are set forth in the appended claims.

Although the invention is illustrated and described herein as embodied in a method for improving acoustic sidetone suppression in hands-free telephones, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
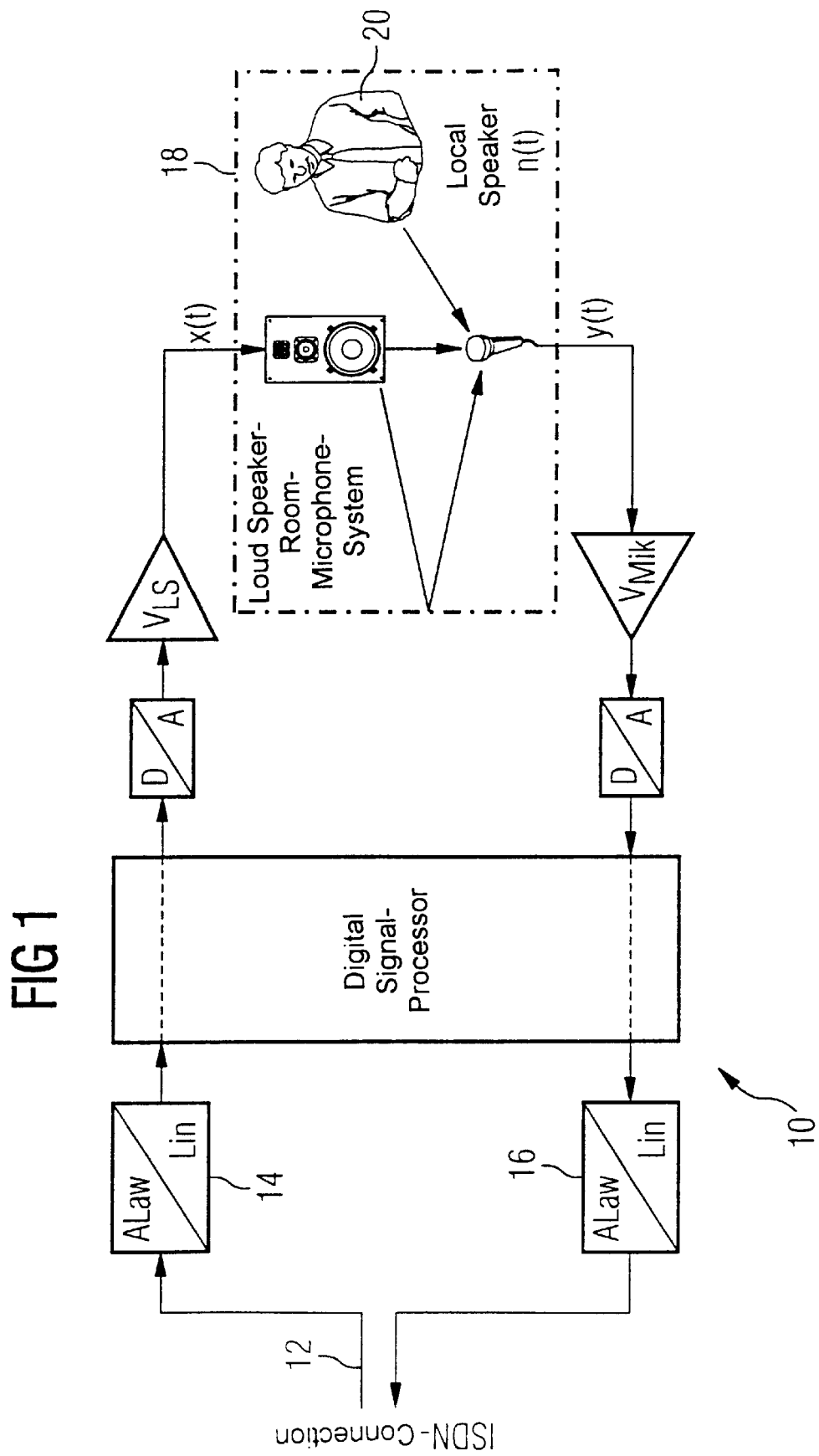
FIG. 1 is a block diagram of a simplified model of a hands-free telephone with connection to a digital link according to the invention.

In all the figures of the drawing, sub-features and integral parts that correspond to one another bear the same reference symbol in each case. Referring now to the figures of the drawing in detail and first, particularly, to FIG. 1 thereof, there is shown a simplified model of a hands-free telephone 10 with connection to a digital link 12. The ALaw coding or decoding used in an European integrated services digital network (ISDN) network is illustrated by blocks 14, 16. Sketched on the right-hand side is a loudspeaker room and microphone system 18 (LRM system) with a local call participant 20, the user of the hands-free telephone 10.

The acoustic coupling between the loudspeaker and the microphone causes crosstalk via the LRM system. The crosstalk is received by the remote subscriber as an objectionable echo. In this case, acoustic waves emerge from the loudspeaker and propagate in the room. Reflection off the walls and other objects located in the room produce a plurality of propagation paths that give rise to different propagation times of the loudspeaker signal. The echo signal at the microphone therefore contains the overlapping of a multiplicity of echo components and, as the case may be, the useful signal n(t): from the local speaker 20.

The link between the subscribers can also produce echoes at transitions between different transmission systems. However, the network providers attempt to take special measures against such echo sources directly at the critical points, and so these echoes can be ignored here. Termination echoes, which are produced in telephones with an analog interface owing to mismatching of the discriminate line to the line impedance can be left out of consideration in the case of the use of digital links.

Figure 2:
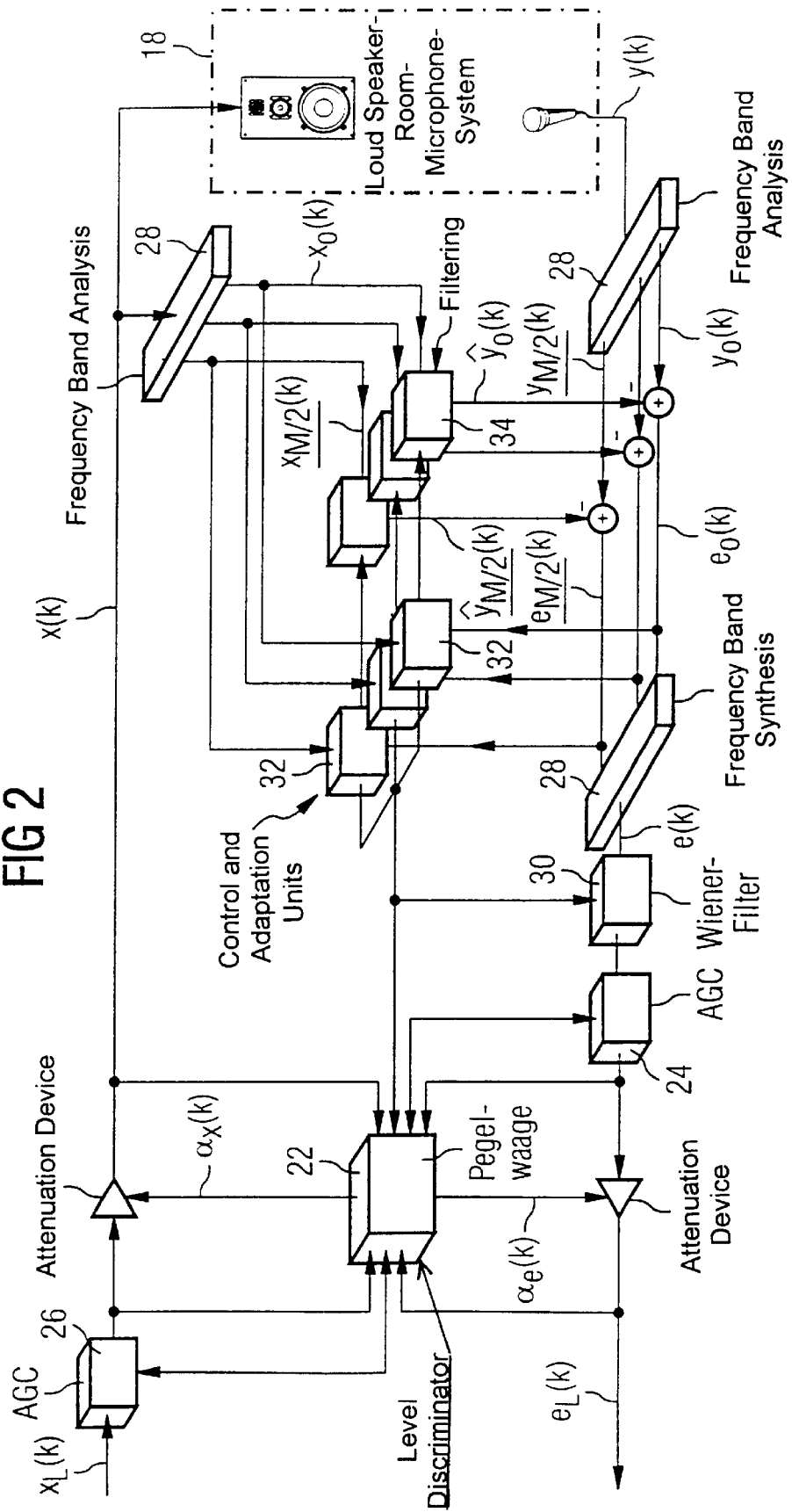
FIG. 2 is a block diagram of the hands-free telephone.

An overview of the hands-free telephone 10 is illustrated in FIG. 2. The central element is a level discriminator 22. Optionally, two automatic gain controls (AGC) 24, 26 can be connected into a transmitting path and a receiving path. The level discriminator 22 guarantees the minimum attenuations prescribed by the ITU or ETSI recommendations by inserting attenuations into the transmitting path and/or the receiving path as a function of the call situation. In the case of activity of the remote subscriber, the receiving path is cleared and a signal of the remote subscriber is output on the loudspeaker without attenuation. The echoes produced in the case of disconnected or poorly balanced compensators are greatly reduced by the attenuation inserted into the transmitting path. The situation is reversed in the case of activity of the local speaker 20. Whereas the receiving path is strongly attenuated, the level discriminator 22 inserts no attenuation into the transmitting path, and the signal of the local speaker 20 is transmitted without attenuation. Controlling the level discriminator 22 becomes more difficult in the duplex case. Here, both paths (and thus also the subscriber signals) in each case receive half the attenuation to be inserted, or in the case of non-optimum control at least one of the two signal paths is attenuated. Consequently, duplex is not possible, or possible only in a restricted fashion.

The use of adaptive echo compensators 28—illustrated in the right-hand part of FIG. 2—provides a remedy here. These attempt to balance the LRM system 18 digitally, in order then to remove the echo component of the remote subscriber from the microphone signal. The overall attenuation to be inserted by the level discriminator 22 can be reduced depending on how well the compensators accomplish this.

The echo compensation is implemented in frequency subbands, the width of the individual bands being between 250 Hz and 500 Hz given an 8 kHz sampling rate, or between 500 Hz and 1000 Hz given a 16 kHz sampling rate. There are several advantages to the use of a frequency-selective echo compensation. On the one hand, the system can be operated as a multi-rate system by using undersampling and oversampling, the result being a reduction in the signal processing outlay. On the other hand, the "compensation performance" can be distributed differently over the individual frequency bands owing to the subband breakdown, the result being to achieve effective adaptation of the "compensation performance" to voice signals. Furthermore, the subband processing has a decorrelating action when the overall band processing is compared with the individual subband systems. For voice signals, this signifies an increase in the convergence rate of the adaptive filters. Alongside these advantages, the disadvantage of subband processing may not be ignored. The breakdown of a signal into individual frequency bands always entails a propagation time. However, since the method is being used for video conferences and/or in global system for mobile communications (GSM) mobile telephones, such propagation times are permissible.

Figure 3:
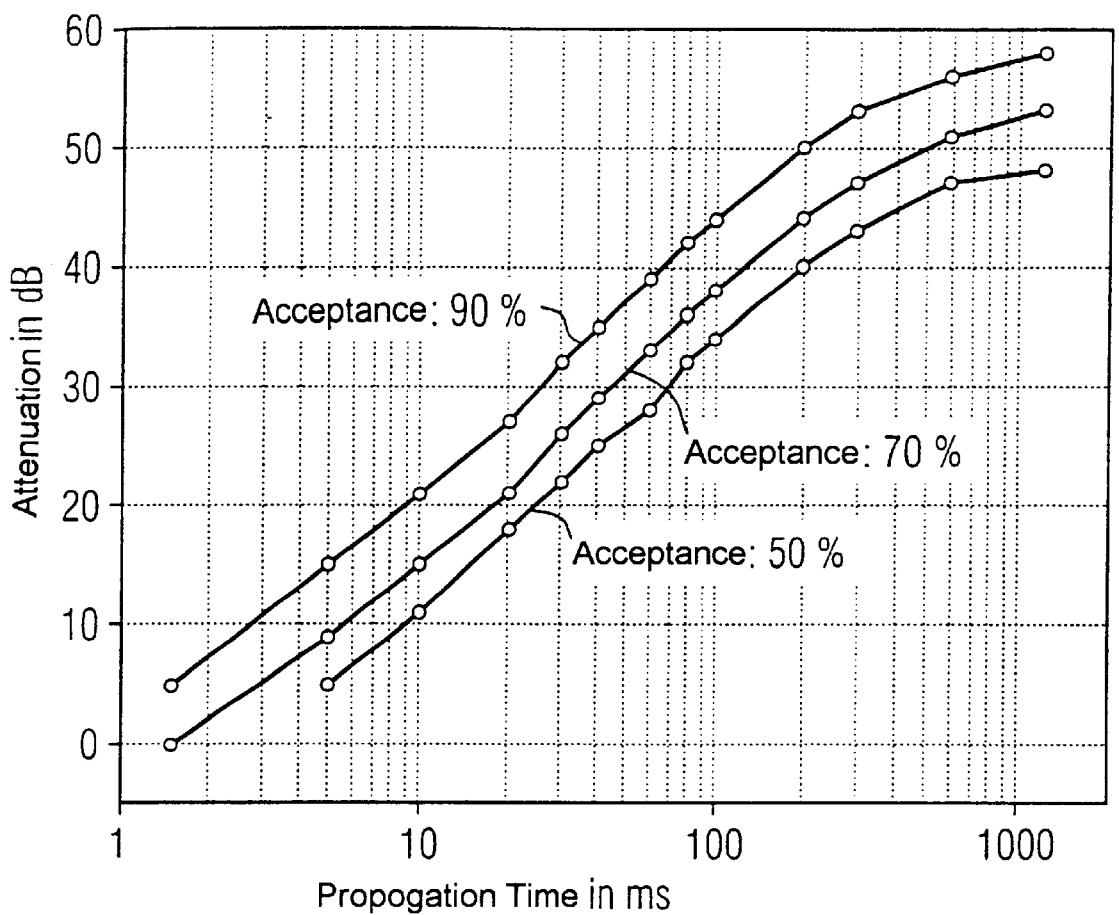
FIG. 3 is a graph showing curves for attenuation requirements of a user as a function of echo propagation time.

In video conference systems, the propagation time is determined chiefly by the image-processing components. Since the aim in general is to output the image and sound of the remote subscriber to the local subscriber with the lips synchronized, the propagation time of the acoustic echoes can be increased to several hundred milliseconds. FIG. 3 illustrates the results of a study in which an attempt was made to find out which return loss dependent on the propagation time of this echo is necessary so that 90, 70 or 50 percent of those asked would be satisfied with the call quality.

Based on this study, a return loss of only 35 dB is necessary in the case of the pure audio propagation time of 30–40 ms (given a sampling rate of 8 kHz). In the case of lip-synchronous emission of image and sound and a propagation time associated therewith of 300 ms, for example, there is an increase in the requirement to 53 dB. In the case of GSM links, as well, the propagation time can be more than 100 ms. The requirements which are placed on echo compensation methods in video conference and GSM systems are therefore higher than the requirements placed on conventional hands-free telephones.

Since the echo compensators are of limited performance and cannot reach such high return losses with the hardware available, a so-called post filter 30 has been introduced. This evaluates the step sizes of the individual subbands together with the other detector results and filters the synthesis filter output signal once more in a frequency-selective fashion. Since the setting algorithm of the filter 30 has been configured in accordance with a Wiener approach, the post filtering is also denoted below as Wiener filtering.

The control of the echo compensators 28 is performed in several stages. Each of the performance-based control units operate for each compensator autonomously, that is to say independently of the remaining frequency bands. Consequently, in FIG. 2 a dedicated adaptation and control unit 32 is sketched in for each of the compensators 28. The control stage based on correlation analyses of the estimated and measured microphone signals is used to detect duplex, and therefore evaluated in like fashion in all frequency bands. A further stage takes account of the accuracy as limited by the fixed comma arithmetic and controls the adaptation as a function of the drive level.

The final duplex detection is likewise performed separately with the aid of a dedicated unit which is based both on the detectors of the level discriminator 22 and on those of the echo compensators 28. This unit causes the level discriminator 22 to reduce once again the overall attenuation to be inserted (in accordance with ITU Recommendation G.167) in duplex situations.

Figure 4:
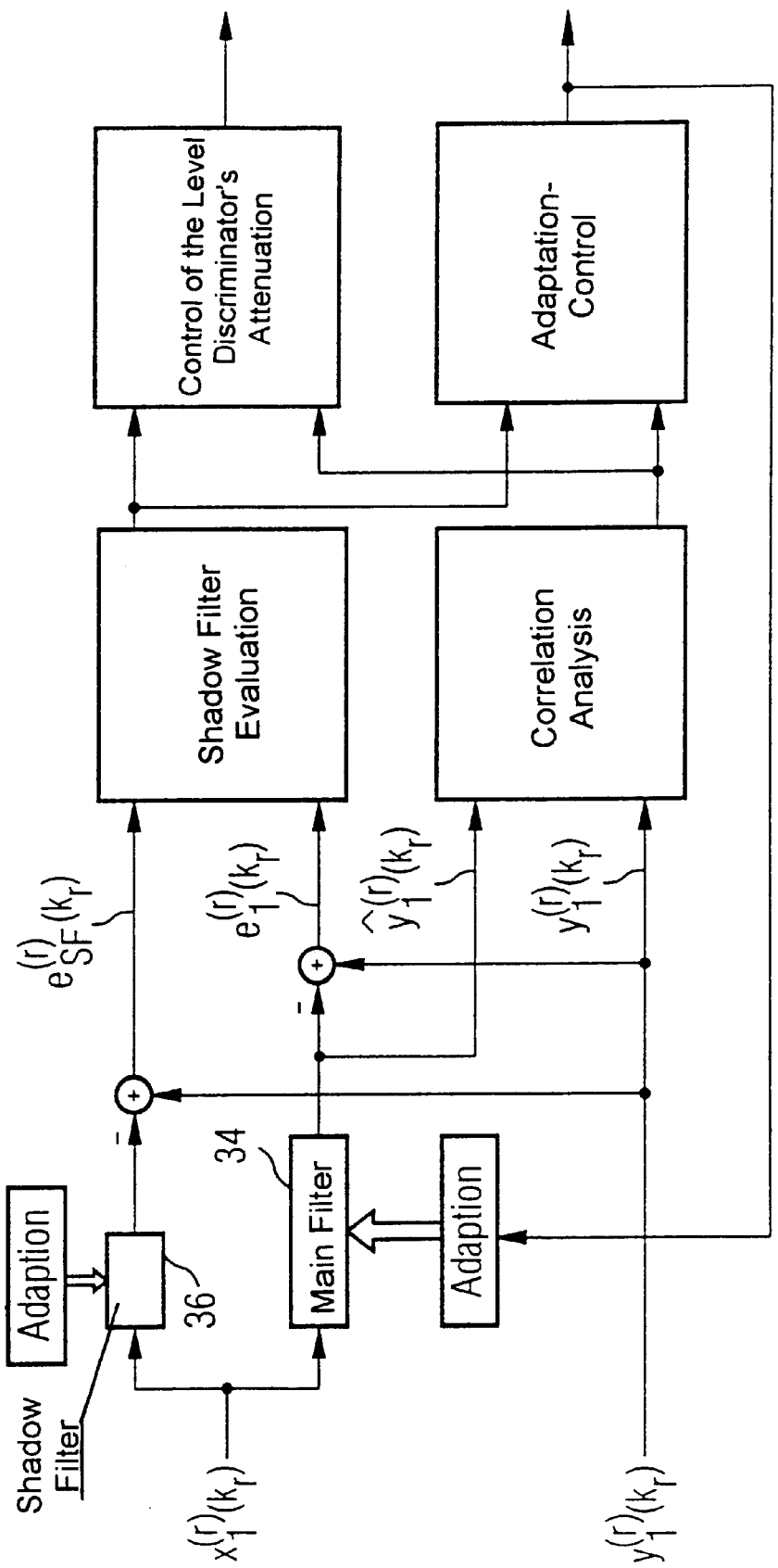
FIG. 4 is a block diagram of an overview of a method according to the invention with a shadow filter and correlation analysis.

In the case of the use of the hands-free telephone 10 in motor vehicles, it is conspicuously more difficult—depending on the interior acoustics—to detect duplex than in office rooms. In particular, with the aid of prior methods it is possible only in a limited fashion to distinguish between duplex and abrupt spatial changes in the case of an increase in signal power in the transmitting path (signal e(k)). In the latter case, driver movements (steering movements, gesticulations) lead to changes in the transmission path between the loudspeaker and microphone, as a result of which the echo compensators 28 are no longer adjusted to the room. Depending on the interior acoustics, the signal power of the right-hand echo therefore increases up to orders of magnitude which are achieved in duplex. A so-called shadow filter or second filter 36 is used in order, in such situations, to prevent the duplex detector from activating the reduction in attenuation (FIG. 4).

In this case, the second filter 36 of conspicuously reduced order—called the shadow filter 36 below—is connected in parallel with one of the echo compensators 34. The second filter 36 is dimensioned such that it can compensate only the direct sound. Owing to its shortened length and to its adapted control, it can adapt substantially more quickly than the actual echo compensation filter 34. The control of the shadow filter 36 is based only on excitation by the remote call participant. After spatial changes, the residual error power (signal $$(\text{signal } e_{SF}^{(n)}(k_r), \text{ FIG. 4})$$

of the shadow filter 36 is reduced much more quickly than that of the long echo compensation filter 34. A detector evaluates the error powers of the two competing filters and, in the case of detected spatial changes, causes a quick estimate of the power transmission factor between the signals x(k) and e(k). As a result, there are no longer erroneous detections of duplex in the case of large spatial changes, and the level discriminator 22 suppresses the residual echo present. Simultaneously, the step size of all the echo compensators 28 is adapted, and this leads to a quick new adaptation. A detailed description follows.

The distinction between simplex and duplex phases is rendered more difficult by strong background noise in motor vehicles (for example engine and wind noises), and is possible only to a limited extent using prior detectors. An extended correlation analysis is presented for the purpose of nevertheless taking account of this boundary condition. By contrast with the prior art, this analysis uses the estimated and measured microphone signals of a subband. This selection permits substantially higher background noise levels without supplying measurably poorer results. Erroneous detections in each case of poorly balanced compensators are intercepted by the shadow filter evaluation.

The combination of these two detection methods—the shadow filter 36 and the correlation analysis—also permit rapid and stable adaptation of the echo compensators even under the difficult conditions in motor vehicles. The control of the residual attenuation, which is to be inserted by the level discriminator 22, can be carried out permissibly with the method described. The control of the reduction in attenuation in the case of duplex is included hereby.

The prior art with reference to shadow filters follows, for example, from S. D. Peters, titled "A Self-Tuning NLMS Adaptive Filter Using Parallel Adaption", IEEE Transactions on Circuits and Systems—II, Analog and Digital Signal Processing, Vol. 44, No. 1, January 1997. In addition to the actual adaptive overall band filter, two shadow filters of equal length are adapted in parallel here. The step size for the actual filter is then determined from the two error signals.

It is only through the use of a single subband shadow filter—which is much shorter than the actual filter—that spatial changes can be detected with a very low outlay using the method proposed in this invention.

The prior art relating to correlation analyses is to be found, for example, in an article by P. Heitkämper, titled "Ein Korrelationsmaß zur Feststellung von Sprecheraktivitäten [A Correlation Measure For Detecting Speaker Activities], 8th Aachen Signal Theory Colloquium, RTWH Aachen, March 1994. Here, the correlation is evaluated between the microphone signal and the loudspeaker signal. The disadvantage of this method consists in the number of erroneous detections, which rises likewise with rising background noise level, so that application in vehicles is impossible, or possible only to a limited extent.

The frequency band analysis and synthesis required for subband processing is implemented as a polyphase filter bank.

In order to be able to use a hands-free method with the level discriminator and the plurality of adaptive echo compensation filters, of which each processes a subband, in motor vehicles as well, it is necessary to undertake adaptations to the changed boundary conditions (by comparison with the use in "normal" office rooms).

Thus, in the case of hands-free operation in motor vehicles conspicuous background noise (for example engine noise and slipstream noise) which disturbs adaptation is to be expected. Furthermore, the power of these noises can fluctuate greatly—operation during fast driving on the motorway, and operation on a quiet parking lot may be advanced for example. The reverberation times of vehicle interiors (approximately 50–80 ms) are much shorter compared with office rooms. Movement of the driver (steering, gesticulation, etc.) therefore have a much greater effect on the impulse response of the loudspeaker/room/microphone system (LRM system).

Combined application of correlation analysis and the shadow filter is presented in order under the boundary conditions described to ensure stable adaptation of the echo compensators and appropriate control of the attenuation requirements to the level discriminator. The method presented further below estimates the variables set forth in Table 1.

The notation of the formula symbols introduced in Table 1 is retained during the entire description. The superscripted (r) and the subscripted r refer to the sampling rate reduced by the factor r. Smoothed variables are denoted by overscores. The choice of individual subbands is performed by suitable selection of the parameter $\mu$.

In order to achieve a stable and fast adaptation of the echo compensators, the subband echo compensators 28 are controlled by their step sizes $$a_\mu^{(r)}(k_r).$$

The defining equation for these variables is:

$$a_\mu^{(r)}(k_r) = \frac{\overline{|x_\mu^{(r)}(k_r)|} \tilde{P}_{\mu,EK}^{(r)}(k_r)}{\overline{|e_\mu^{(r)}(k_r)|}} \quad (2.1)$$

The variables $$\overline{|x_\mu^{(r)}(k_r)|}$$

and $$\overline{|e_\mu^{(r)}(k_r)|}$$

in this case represent smoothed estimated values for the signal power of the remote subscriber and, respectively, for the error performance. Both estimated variables are determined by non linear recursive first order smoothings of absolute values.

TABLE 1

Estimated variables and their definitions

| Designation | Meaning |
|---|---|
| $a_\mu^{(t)}(k_t)$ | Step size of the echo compensator in the subband $\mu$ - the range of values of this variable is between zero and one. For a step size of $a_\mu^t(k_r) = 0$, the old space estimate is retained - in the case of a step size of $a_\mu^{(t)}(k_t) = 1$, adaptation is performed at maximum speed. |
| $\overline{\tilde{P}_{\mu,EK}^{(t)}(k_t)}$ | Power transmission factor in the subband $\mu$. |
| $\overline{P_{EK}(k)}$ | Power transmission factor in the overall band or attenuation reduction of the level discriminator. |
| $\overline{|x_\mu^{(t)}(k_t)|}$ | Estimated variable for the signal power of the remote call participant (excitation power) in the subband $\mu$. |
| $\overline{|x(k)|}$ | Estimated variable for the signal power of the remote call participant (excitation power) in the overall band. |
| $\overline{|e_\mu^{(t)}(k_t)|}$ | Estimated variable for the error performance in the subband $\mu$. |
| $\overline{|e(k)|}$ | Estimated variable for the error performance in the overall band. |

$$\overline{|x_\mu^{(r)}(k_r)|} = \beta_x(k_r)(|\text{Re}\{x_\mu^{(r)}(k_r)\}| + |\text{Im}\{x_\mu^{(r)}(k_r)\}|) + (1 - \beta_x(k_r))\overline{|x_\mu^{(r)}(k_r - 1)|}$$

$$\overline{|e_\mu^{(r)}(k_r)|} = \beta_e(k_r)(|\text{Re}\{e_\mu^{(r)}(k_r)\}| + |\text{Im}\{e_\mu^{(r)}(k_r)\}|) + (1 - \beta_e(k_r))\overline{|e_\mu^{(r)}(k_r - 1)|}$$

where $$\beta_x(k_r) = \begin{cases} \beta_R, & \text{if } |\text{Re}\{x_\mu^{(r)}(k_r)\}| + |\text{Im}\{x_\mu^{(r)}(k_r)\}| \rangle \overline{|x_\mu^{(r)}(k_r - 1)|} \\ \beta_F, & \text{otherwise} \end{cases} \quad (2.2)$$

$$\beta_e(k_r) = \begin{cases} \beta_R, & \text{if } |\text{Re}\{e_\mu^{(r)}(k_r)\}| + |\text{Im}\{e_\mu^{(r)}(k_r)\}| \rangle \overline{|e_\mu^{(r)}(k_r - 1)|} \\ \beta_F, & \text{otherwise} \end{cases}$$

The time constants $\beta_R$ and $\beta_F$ are chosen in this case such that a rise in the signal power can be tracked more quickly than a drop in the power. The actual calculation of the step sizes uses a DSP-specific logarithmation or linearization.

The power transmission factors $$\tilde{p}_{\mu,EK}^{(r)}(k_r)$$

in the individual subbands are estimated when permitted by the state of the hands-free telephone. The quality of these estimates also has a lasting influence on the quality of the overall hands-free telephone, and a substantially higher outlay of method will be adopted accordingly in determining these variables.

Figure 5:
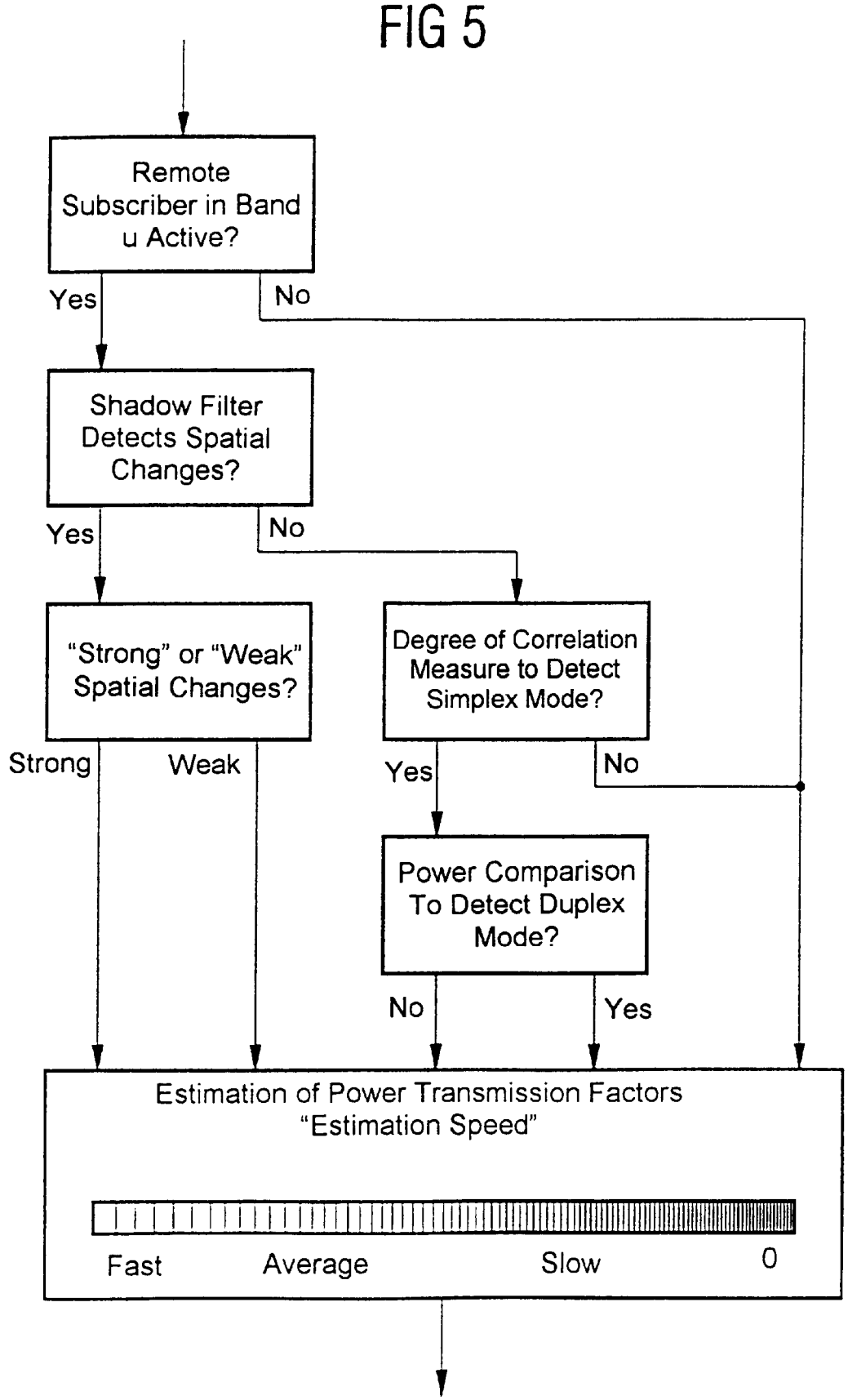
FIG. 5 is a flow chart showing the control of power transmission factors in an overview.

FIG. 5 illustrates an overview for estimating the power transmission factors. In principle, these factors should be estimated only in the case of simplex mode for the remote subscriber. If simplex is detected, the variance of the estimate can be influenced by various time constants. Very sluggish estimation methods lead to very good results in stationary conditions. In these cases, the hands-free telephone achieves states in which it can be operated in full duplex or at least virtually full duplex mode, that is to say duplex is possible without noticeable attenuation by meeting the ITU recommendations.

If the state of the hands-free telephone changes, for example owing to spatial changes, sluggish estimation methods lead to erroneous detections, and undesired reductions occur in the return loss, that is to say a reduction in call quality occurs.

Distinguishing between duplex and spatial changes is particularly critical. Both lead to a rise in the error performance. In the case of duplex, the estimation of the power transmission factors should be continued, and the overall attenuation of the level discriminator should be reduced in accordance with the ITU-T or ESTI recommendations. In the case of spatial changes, the power transmission factors should be re-estimated as quickly as possible.

Before the explicit calculating formulae are specified for the individual transmission factors, the two detectors which are intended to detect spatial changes or duplex are presented in the two following sections. The combined evaluation that is required for determining the power transmission factors is likewise described in a dedicated section.

Figure 6:
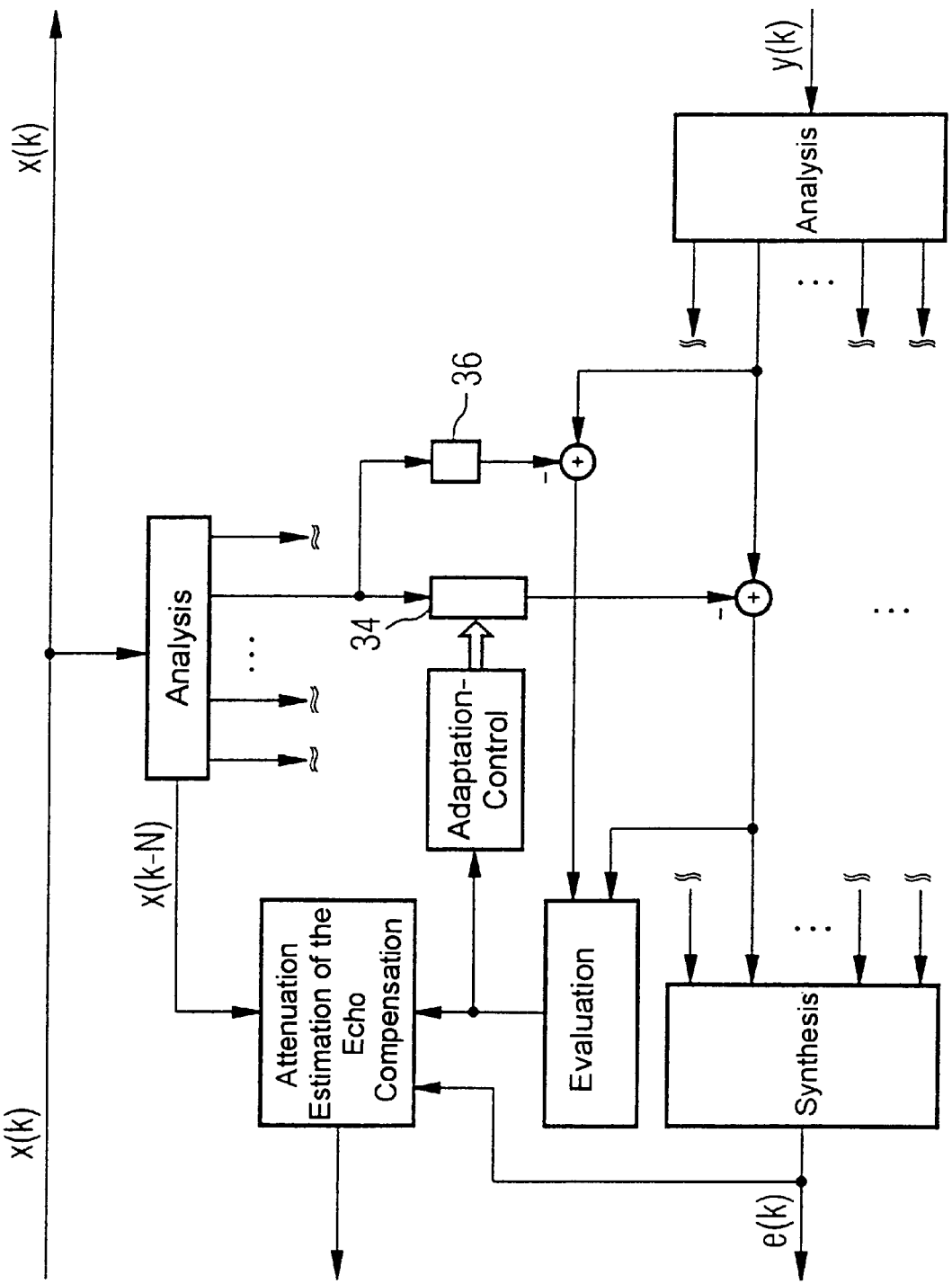
FIG. 6 is a block diagram of an overview of a shadow filter approach.

In order to detect spatial changes, a second filter is connected in parallel with the actual adaptive filter in the first subband—frequency range 250 Hz–750 Hz (FIG. 6). This so-called shadow filter is conspicuously shorter than the conventional one and is configured such that it can chiefly compensate the direct sound and the first reflections.

Because of the reduced order, the shadow filter can tune much more quickly if also not so far than the longer echo compensation filter.

The shadow filter $\underline{c}_{SF}^{(r)}(k_r)$ is adapted like the subband echo compensators $\underline{c}_\mu^{(r)}(k_r)$ with the aid of an NLMS algorithm $$\underline{c}_\mu^{(r)}(k_r+1) = \underline{c}_\mu^{(r)}(k_r) + \alpha_\mu^{(r)}(k_r)\frac{e_\mu^{(r),*}(k_r)\underline{x}_\mu^{(r)}(k_r)}{\underline{x}_\mu^{(r),H}(k_r)\underline{x}_\mu^{(r)}(k_r)} \quad (2.3)$$

$$\underline{c}_{SF}^{(r)}(k_r+1) = \underline{c}_{SF}^{(r)}(k_r) + \alpha_{SF}^{(r)}(k_r)\frac{e_{SF}^{(r),*}(k_r)\underline{x}_{SF}^{(r)}(k_r)}{\underline{x}_{SF}^{(r),H}(k_r)\underline{x}_{SF}^{(r)}(k_r)} \quad (2.4)$$

Vectors are marked here by underscoring. The notation $^H$ stands for Hermitian—and the superscripted star * describes complex conjugation. The vector $$\underline{x}_{SF}^{(r)}(k_r)$$

follows from the excitation vector of the first subband $$\underline{x}_1^{(r)}(k_r)$$

by appropriate length shortening. In contrast with the case of the echo compensators, the step size of the shadow filter is controlled exclusively by standard:

$$\alpha_{SF}^{(r)}(k_r) = \begin{cases} \alpha_{sf} & \text{if } \underline{x}_{SF}^{(r),H}(k_r)\underline{x}_{SF}^{(r)}(k_r))N_{sf} \\ 0 & \text{otherwise.} \end{cases} \quad (2.5)$$

The parameter $\alpha_{sf}$ can be set and should be approximately 1. The variable $N_{sf}$ can likewise be set and should be adapted to the length of the shadow filter.

The error performances of the echo compensation filter and the shadow filter are compared in order to detect spatial changes. As already introduced above, non-linear, recursive first order smoothings of absolute value are calculated for this purpose:

$$\overline{|e_{v,1}^{(r)}(k_r)|} = \beta_v(|\text{Re}\{e_1^{(r)}(k_r)\}| + |\text{Im}\{e_1^{(r)}(k_r)\}|) + (1-\beta_v)\overline{|e_{v,1}^{(r)}(k_r-1)|} \quad (2.6)$$

$$\overline{|e_{v,SF}^{(r)}(k_r)|} = \beta_v(|\text{Re}\{e_{SF}^{(r)}(k_r)\}| + |\text{Im}\{e_{SF}^{(r)}(k_r)\}|) + (1-\beta_v)\overline{|e_{v,SF}^{(r)}(k_r-1)|}. \quad (2.7)$$

The quotient of these two estimators $$R^{(r)}(k_r) = \frac{\overline{|e_{v,SF}^{(r)}(k_r)|}}{\overline{|e_{v,1}^{(r)}(k_r)|}} \quad (2.8)$$

determines the detector output, which is generated as follows:

| Condition | Detection result |
|---|---|
| $R^{(r)}(k_r) \geq R_0$ | no spatial changes detected, |
| $R_0 > R^{(r)}(k_r) \geq R_1$ | weak spatial changes detected, |
| $R_1 \geq R^{(r)}(k_r)$ | strong spatial changes detected. |

It holds here that $R_0 > R_1$. The quotient calculation is carried out again by using the logarithmation or linearization. The further use of the detection results is described further below.

It is proposed to calculate a normalized correlation estimate between the measured $$y_1^{(r)}(k_r)$$

and the estimated microphone signals $$\hat{y}_1^{(r)}(k_r)$$

in order to detect duplex. However, to simplify the calculation it is not the whole signal, but only the respective real part which is used in this case. The correlation coefficient $$\rho_0^{(r)}(k_r)$$

is calculated as follows:

$$\rho_o^{(r)}(k_r) = \frac{\left|\sum_{i=0}^{N-1} \text{Re}\{y_1^{(r)}(k_r - i)\}\text{Re}\{\hat{y}_1^{(r)}(k_r - 1)\}\right|}{\sum_{i=0}^{N-1} |\text{Re}\{y_1^{(r)}(k_r - i)\}\text{Re}\{\hat{y}_1^{(r)}(k_r - 1)\}|} \quad (2.9)$$

Owing to the absolute-value generations, the correlation coefficient can assume a range of values of $P_0^{(r)}(k_r) \in [0 \ldots 1]$. In this case, small values signify only a slight correlation between the signals, that is to say duplex; by contrast, values close to 1 indicate a high correlation, that is to say simplex.

The correlation analysis proceeds from already balanced compensators whereas the signals $$y_1^{(r)}(k_r)$$

and $$\hat{y}_1^{(r)}(k_r)$$

then have no difference in propagation time. This does not hold for poorly balanced compensators. In order, nevertheless, to permit analysis here, as well, the evaluation is carried out for a time offset in both directions. The correlation coefficients $P_n^{(r)}(k_r)$ are calculated for various values of n:

$$\rho_n^{(r)}(k_r) = \frac{\left|\sum_{i=n}^{N-1} \text{Re}\{y_1^{(r)}(k_r - i + n)\}\text{Re}\{\hat{y}_1^{(r)}(k_r - i)\}\right|}{\sum_{i=n}^{N-1} |\text{Re}\{y_1^{(r)}(k_r - i + n)\}\text{Re}\{\hat{y}_1^{(r)}(k_r - i)\}|} \text{ for } n \geq 0 \quad (2.10)$$

$$\rho_n^{(r)}(k_r) = \frac{\left|\sum_{i=0}^{N-1+n} \text{Re}\{y_1^{(r)}(k_r - i + n)\}\text{Re}\{\hat{y}_1^{(r)}(k_r - 1)\}\right|}{\sum_{i=0}^{N-1+n} |\text{Re}\{y_1^{(r)}(k_r - i + n)\}\text{Re}\{\hat{y}_1^{(r)}(k_r - 1)\}|} \quad (2.11)$$

The values for n are preferably extracted from an interval of whole numbers that contains the value 0. It is preferred to calculate $$\rho_n^{(r)}(k_r)$$

for five values of n.

The sums of the numerator or denominator can be calculated recursively to reduce the outlay. The maximum that will be calculated correlation coefficients $$\rho_{\max}^{(r)}(k_r) = \text{Max}_n\{\rho_n^{(r)}(k_r)\}. \quad (2.12)$$

is decisive for the detector output. The detection criterion can therefore be specified as follows:

| Condition | Detection result |
|---|---|
| $P_{\max}^{(r)}(k_r) \geq P_g$ | Simplex (remote) detected, |
| $P_{\max}^{(t)}(k_t) \geq P_g$ | Duplex detected. |

The at first only "coarse" description (FIG. 5) of the estimates of the power transmission factors can be concretized using the detectors described above. The excitation detection of the remote speaker is interrogated by the condition.

$$\overline{|x_\mu^{(r)}(k_r)|} \rangle x_{s,\mu} \quad (2.13)$$

If the smoothing of absolute value exceeds a limiting value, further criteria are interrogated. In the other case, there is insufficient excitation detected, and this leads to halting of the adaptation $$a_\mu^{(r)}(k_r) = 0 \quad (2.14)$$

and retention of the previous estimated value of the transmission factor $$\overline{\tilde{p}_{\mu,EK}^{(r)}}(k_r) = \overline{\tilde{p}_{\mu,EK}^{(r)}}(k_r - 1) \quad (2.15)$$

The threshold values should be adapted to the statistic properties of the input signal, in particular to the power density spectrum. Should sufficient excitation have been detected, the detection of spatial change by the shadow filter is evaluated in a second detection stage. Should the shadow filter detect "strong" spatial changes $$R_1 \geq R^{(r)}(k_r) \quad (2.16)$$

a first order non linear, recursive smoothing of the power transmission factors is carried out. By comparison with the estimates carried out further below, this smoothing uses the shortest time constants. The estimated values therefore track the instantaneous values very quickly. The conditional equation of the transmission factors is as follows in the case of detected strong spatial changes:

$$\overline{\tilde{p}_{\mu,EK}^{(r)}}(k_r) = \beta_L(k_r)\frac{\overline{|e_\mu^{(r)}(k_r)|}}{\overline{|x_\mu^{(r)}(k_r)|}} + (1 - \beta_L(k_r))\overline{\tilde{p}_{\mu,EK}^{(r)}}(k_r - 1). \quad (2.17)$$

The time constant is set as follows in this case:

$$\beta_L(k_r) = \begin{cases} \beta_{RO,R} & \text{if } \frac{\overline{|e_\mu^{(r)}(k_r)|}}{\overline{|x_\mu^{(r)}(k_r)|}} \rangle \tilde{p}_{\mu,EK}^{(r)}(k_r - 1) \\ \beta_{RO,F} & \text{otherwise} \end{cases} \quad (2.18)$$

where $0 < \beta_{RO,F} < \beta_{RO,R} < 1$

In the case of a detection of "weak" spatial changes $$R_0 \leq R^{(r)}(k_r) \leq R_1 \quad (2.19)$$

a recursive smoothing is likewise carried out in accordance with equation 2.17, but using the time constants $$\beta_L(k_r) = \begin{cases} \beta_{R1,R} \text{ if } \frac{\overline{|e_\mu^{(r)}(k_r)|}}{|x_\mu^{(r)}(k_r)|} \rangle \overline{\tilde{p}_{\mu,EK}^{(r)}(k_r - 1)} \\ \beta_{R1,F} \text{ otherwise.} \end{cases} \quad (2.20)$$

where $0<\beta_{R1,F}<\beta_{R1,R}<1$

By comparison with the detection of strong spatial changes, the re-estimation of the power transmission factors is performed more slowly, that is to say it holds that:

$$\beta_{R1,F} > \beta_{R0,F} \quad (2.21)$$

$$\beta_{R1,F} > \beta_{R0,R}. \quad (2.22)$$

If the shadow filter detected no spatial changes $$R_0 \leq R^{(r)}(k_r), \quad (2.23)$$

further criteria are evaluated to distinguish simplex and duplex. The first stage forms the correlation analysis already mentioned here. If the condition $$\rho_{\max}^{(r)}(k_r) \langle \rho_g \quad (2.24)$$

is fulfilled, duplex is detected and the transmission factor estimation is halted, that is to say $$\overline{\tilde{p}_{\mu,EK}^{(r)}(k_r)} = \overline{\tilde{p}_{\mu,EK}^{(r)}(k_r - 1)}. \quad (2.25)$$

In the case of a simplex detection by the correlation analysis $$\rho_{\max}^{(r)}(k_r) \geq \rho_g. \quad (2.26)$$

a further comparison is made in order to exclude duplex situations as far as possible. Should the measured overall band error performance be below the estimated value, simplex is finally detected. The condition for this is as follows:

$$\overline{|x(k)|} \, \overline{\tilde{p}_{EK}(k)} K_{GS} \langle \overline{|e(k)|}. \quad (2.27)$$

The second stage of the duplex recognition is evaluated using overall band signals. The variables $$\overline{|x(k)|}$$

and $$\overline{|e(k)|}$$

are determined in accordance with $$\overline{|x(k)|} = \beta_{GB,x}(k)|x(k - N_{AS})| + (1 - \beta_{GB,x}(k))\overline{|x(k-1)|}$$

$$\overline{|e(k)|} = \beta_{GB,e}(k)|e(k)| + (1 - \beta_{GB,e}(k))\overline{|e(k-1)|}$$

where $$\beta_{GB,x}(k) = \begin{cases} \beta_{GB,R}, \text{ if } |x(k - N_{AS})| \rangle \overline{|x(k-1)|} \\ \beta_{GB,F} \text{ otherwise} \end{cases} \quad (2.28)$$

$$\beta_{GB,e}(k) = \begin{cases} \beta_{GB,R}, \text{ if } |e(k)| \rangle \overline{|e(k-1)|} \\ \beta_{GB,F}, \text{ otherwise} \end{cases}$$

In the case of these recursive estimators, as well, the time constants $\beta_{GB,R}$ and $\beta_{GB,F}$ are chosen such that a rise in the signal power is tracked quickly, while a drop in power is tracked more slowly, that is to say $\beta_{GB,F} > \beta_{GB,R}$. Since a propagation time is inserted between the microphone and error signals by the filter bank, the excitation signal of the remote subscriber is correspondingly delayed, and the variable $N_{AS}$ therefore describes the length of the analysis or synthesis filter.

The calculation of the overall band power transmission factor $$\overline{\tilde{p}_{EK}(k)}$$

is performed analogously to the subband transmission factors using several detectors. First, the excitation power of the remote subscriber is checked—the old estimate is retained if a threshold is not exceeded here. Should sufficient excitation have been detected, the error performance of the shadow filter is evaluated, and in the case of detection of spatial change, the $$\overline{\tilde{p}_{EK}(k)} -$$

estimation is carried out using correspondingly short time constants. If the shadow filter detector detects no spatial changes, the correlation analysis of the first subband is evaluated as a last control stage. If simplex is detected in this case (condition 2.26), recursive smoothed estimation is carried out, otherwise the old transmission factor is retained.

A reaction can be made to the variance of the variables featuring in the condition 2.27 by use of the constant $K_{GS}$—they should be chosen such that duplex is detected even in the case of slight fluctuations in the signal powers. Duplex should not be detected until the measured error performance exceeds the estimated performance by a specific value. In such cases, the estimation of the power transmission factors (equation 2.17) is carried out very sluqqishly, that is to say $$\beta_L(k_r) = \begin{cases} \beta_{R3,R} \text{ if } \frac{\overline{|e_\mu^{(r)}(k_r)|}}{|x_\mu^{(r)}(k_r)|} \rangle \overline{\tilde{p}_{\mu,EK}^{(r)}(k_r - 1)} \\ \beta_{R3,F} \text{ otherwise} \end{cases} \quad (2.29)$$

where $0<\beta_{R3,F}<\beta_{R3,R}<1$

In the other case of detection—detection of simplex—the time constants are set in accordance with $$\beta_L(k_r) = \begin{cases} \beta_{R2,R} \text{ if } \frac{|e_\mu^{(r)}(k_r)|}{|x_\mu^{(r)}(k_r)|} \sqrt{\overline{p}_{\mu,EK}^{(r)}(k_r - 1)} \\ \beta_{R2,F} \text{ otherwise} \end{cases} \quad (2.30)$$

where $0 < \beta_{R2,F} < \beta_{R2,R} < 1$

All possible paths of FIG. 5 are thereby provided with explicit data on the detection conditions. It holds in this case for the individual time constants that:

$$0 < \beta_{RO,R} < \beta_{R1,R} < \beta_{R2,R} < \beta_{R3,R} < 1, \quad (2.31)$$

$$0 < \beta_{RO,F} < \beta_{R1,F} < \beta_{R2,F} < \beta_{R3,F} < 1. \quad (2.32)$$

The quality of the estimation of the subband transmission factor and the overall band transmission factor emphatically determines the quality of the entire hands-free telephone. The subband estimated values are of great importance for a stable and, overall, fast adaptation. Only when the echo compensators achieve high return losses can the hands-free telephone be "guided" out of the half-duplex mode and operate virtually without perceptible attenuation by a level discriminator. The estimation of attenuation must be of high quality in the overall band $$(\overline{p}_{EK}(k))$$

for the case of strong spatial changes, which occurs more frequently during operation in motor vehicles. The requirements set can be satisfactorily fulfilled with a low computational outlay using the method described here.

I claim:

1. A method for improving acoustic sidetone suppression, which comprises the steps of:
   providing a hands-free telephone having a level discriminator and a plurality of adaptive echo compensation filters each processing a subband;
   connecting a further adaptive filter of a different order in parallel with an adaptive echo compensation filter of the adaptive echo compensation filters in at least one half band; and
   detecting spatial changes using a correlation analysis and a power evaluation of an output of the further adaptive filter.

2. The method according to claim 1, which comprises using a plurality of different sampling rates.

3. The method according to claim 1, which comprises providing the further adaptive filter with a substantially lower order than that of the adaptive echo compensation filter.

4. The method according to claim 1, which comprises using a filter bank divided into frequency subbands as the adaptive echo compensation filters.

5. The method according to claim 1, which comprises using power evaluations of the further adaptive filter and the adaptive echo compensation filters having different orders and correlation-based analyses in order to control an adaptation and a step size.

6. The method according to claim 4, which comprises estimating power transmission factors in subbands in order to determine a step size.

7. The method according to claim 1, which comprises using the adaptive echo compensation filters for supplying estimated values for a return loss introduced by them.

8. The method according to claim 7, which comprise using the estimated values to control an attenuation of the level discriminator.

9. The method according to claim 1, which comprises detecting simultaneous activity of both call participants operating under a duplex mode.

10. The method according to claim 9, which comprises reducing an overall attenuation of the level discriminator in the duplex mode.

* * * * *